(No Model.)
W. MERRILL.
CIRCULAR SAWING MACHINE.
No. 316,634. Patented Apr. 28, 1885.
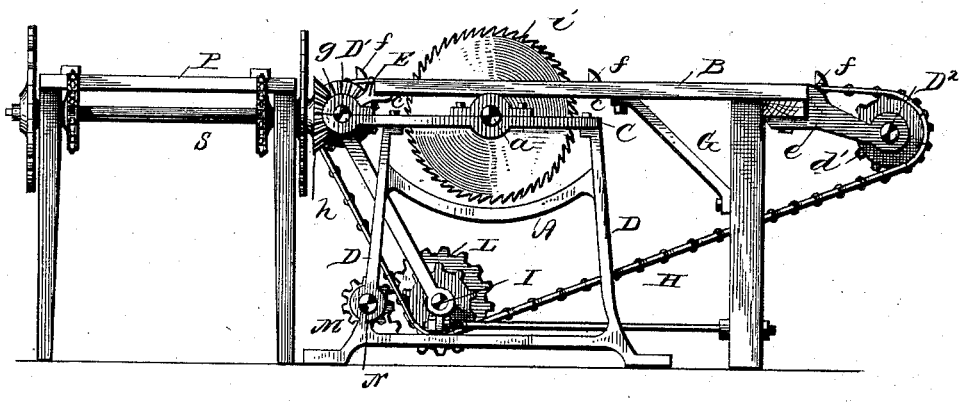
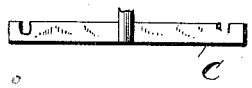
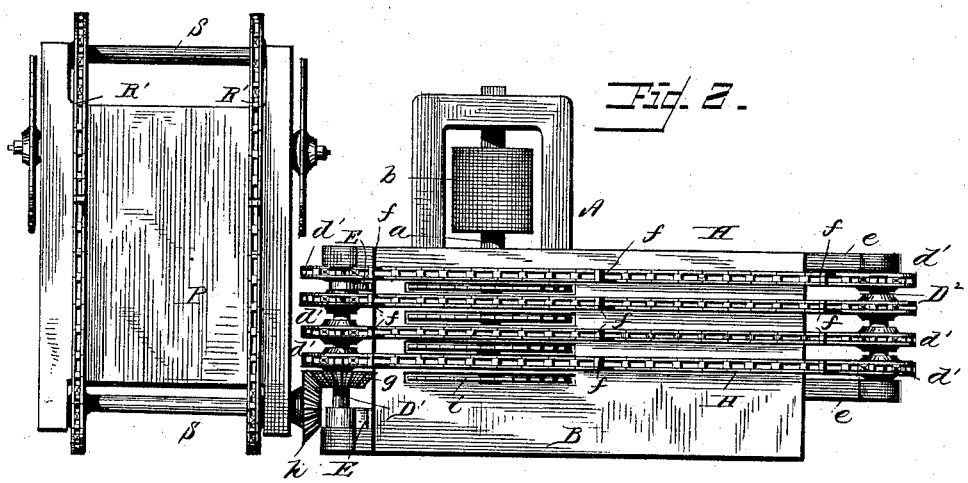
WITNESSES
INVENTOR
William Merrill.
by Frank Sheehy
his Attorney

UNITED STATES PATENT OFFICE.

WILLIAM MERRILL, OF EAST SAGINAW, MICHIGAN, ASSIGNOR OF ONE-HALF TO SYLVANIS S. MITTS, OF SAME PLACE.

CIRCULAR SAWING MACHINE.

SPECIFICATION forming part of Letters Patent No. 316,634, dated April 28, 1885.

Application filed September 22, 1884. (No model.)

*To all whom it may concern:*

Be it known that I, WILLIAM MERRILL, a citizen of the United States, residing at East Saginaw, State of Michigan, have invented certain new and useful Improvements in Machines for Cutting Sticks of Particular Dimensions, of which the following is a specification, reference being had therein to the accompanying drawings.

This invention has relation to improvements in machines for cutting sticks to particular dimensions; and it consists in the construction and novel arrangement of devices, as will be hereinafter more fully set forth, and particularly pointed out in the claims appended.

The object of this invention is to provide a cheap and durable machine for effectually cutting slabs or boards into bolts or pieces for forming staves, pickets, or other similar articles, the longitudinal and transverse cut of the said strips being effected without removing the said tables.

Another object of the invention is to provide means whereby the saws, or any of them, may be placed upon and removed from the arbor without necessitating the removal or disconnection of various parts of the machine, as has heretofore been the practice.

The objects above mentioned we accomplish by the mechanism illustrated in the accompanying drawings, in which—

Figure 1 is a side elevation of our machine, showing the edger-frame in end elevation, and Fig. 2 is a plan view of the same. Fig. 3 is a view of the girt C removed from the machine.

Referring to the said drawings by letter, A indicates a frame for supporting an arbor, $a$, suitably journaled in the upper portion thereof, and adapted to carry any desired number of circular saws, there being four shown in the present instance. This arbor is arranged transversely of the table B, and may be provided near one end with a fixed pulley, $b$, by which, through the medium of a belt or chain, motion may be imparted to the saws, which are designed to pass through slots in the said table, as shown.

The girt or upper bar, C, of the frame A, in which one end of the arbor $a$ is journaled, is removably secured to the upper ends of the standards D by means of screws or bolts $c\ c$, the bar being slotted, as shown, for their reception.

$D'$ and $D^2$ are transverse shafts arranged, respectively, at opposite ends of the table B, and are provided with a suitable number of chain-wheels, $d'$.

The inner end of the table B is attached to the arms E, which have their bearings on the shaft $D'$, and are adapted to move loosely thereon, and the shaft $D'$ is designed to serve as a hinge-pintle for the table B. Thus it will be seen that when it is desirable to remove the saws from the arbor $a$ for any purpose whatever the operator need simply to loosen the screws or bolts $c$ at opposite ends of the bar C, and after throwing up the outer end of the table B, the same hinging on the shaft $D'$, as before mentioned, the said bar can be removed and the saws taken from the arbor, as desired, without removing any other parts of the machine.

G indicates a frame for supporting the table B above the frame supporting the saws, and is provided at its outer end with arms or brackets $e$, for supporting the transverse shaft $D^2$, carrying the chain-wheels $d'$.

H indicates endless feed-chains for feeding the stock or timber to the saws for cutting the same longitudinally and into the width desired. These chains are provided on their upper sides at suitable intervals with dogs or lugs $f$, and pass over the chain-wheels on the shafts $D'$ and $D^2$, and also over similar chain-wheels on a lower horizontal transverse shaft, I. The chains are of such a width as to conveniently pass one on each side of the respective saws on the arbor $a$. The shaft I is also provided with a fixed gear-wheel, L, which meshes with and receives motion from a pinion, M, arranged upon a power-shaft, N, journaled in the lower portion of the frame A, as shown. One end of the shaft $D'$ is provided with a fixed miter-gear, $g$, which engages a similar gear, $h$, fixed to the adjacent end of a shaft, S, arranged at right angles to the shaft $D'$, and extending transversely across one end of the table P, which is also arranged at right angles to the table B, and is designed to receive the strips as they are carried from the circular saws $i$ by means of the endless chains H, as will be presently explained. The table P is suitably supported on the same horizontal plane as the table B, extending at right angles from the inner end of the latter, and is provided at opposite ends with a transverse shaft, S, carrying chain-wheels of the same diameter as the chain-wheels on the shafts D' and D² of the table A. Over these chain-wheels pass endless chains R', which are also provided with suitably-arranged dogs or lugs, and are designed to receive and feed the strips to the edging-saws as they are carried onto the table P from the table B by the endless chains H. The edging-saws or those for cutting the length of the sticks are arranged on a shaft located transversely at the end of the table P farthest from the table B, the saws being opposite and on the outer side of each longitudinal side beam of the said table P.

By having the chain-wheels of both tables of the same diameter, and the connecting-gearing of a corresponding form, it will be readily seen that the feeding of the respective feed-chains will be uniform and driven at the same rate of speed. Therefore, by increasing the motion of the chains of one table those of the other will be uniformly and simultaneously increased, and by arranging the lugs or dogs of the respective chains with relation to each other the strips cut from a board by the saws of the table B will be discharged onto the table P just in time to be caught by the lugs of the chains thereon and carried to the edging-saws during the entire operation of the machine. Therefore, it will be seen that a very rapid and uniform cut may be made without any experience on the part of the workman, and the objectionable slides for feeding the stock dispensed with.

The operation of my machine is as follows: The pinion-shaft being rotated by any suitable mechanical motive power, its pinion, engaging the fixed gear-wheel on the shaft I, also carrying chain-wheels, will impart motion to the engaging endless feed-chain G, which, passing over the chain-wheels on the shafts D and D', will rotate the same, and, through the medium of the miter-gears g and h, motion will be communicated to the shaft S of the table P, and thence imparted to the shaft carrying chain-wheels at the opposite end of the said table P. It will be perceived that just as soon as the pinion-shaft is rotated the chains of both tables will be moved simultaneously. The machine being thus set in motion, a board may be fed upon the endless chains G' at the outer end of the table B, whence it will be carried by the dogs or lugs on the said chains to and past the saws i, severing the same longitudinally in the desired width, when the strips will be fed onto the chains R' of the table P, where they will be seized by the lugs of the said chains and carried to the edging-saws and cut to the desired length, after which they are discharged from the opposite end of the said table.

Having thus described my invention, what I claim as new, and desire to secure by Letters Patent, is—

1. The combination, with the frame supporting the saws, and the table B and frame supporting the same above the saw-supporting frame, of the transverse shaft arranged at the inner end of the said table, with its bearings in the said saw-supporting frame, and carrying a fixed miter-gear engaging a similar gear on a shaft of the adjacent table, and the arms connecting the table B with the said transverse shaft, whereby a hinge-joint is formed between the said shaft and table, whereby the latter can be raised for the removal of saws from the arbor, substantially as specified.

2. The combination, with the frame supporting the saws, and the table B and frame supporting the same above the saw-supporting frame, of the transverse shaft arranged at the inner end of the said table, with its bearings in the said saw-supporting frame, and provided with chain-wheels for receiving endless feed chains or belts, and adapted to serve the additional function of a hinge for the said table, whereby the same may be raised at one end in removing the saws from the arbor beneath, substantially as specified.

3. In a machine for sawing sticks of particular dimensions, the combination, with the tables B and P, of the transverse shafts arranged at opposite ends thereof, and provided with chain-wheels, the endless chains R' and G', passing over the said chain-wheels, the miter-gears g and h, fixed to the transverse shafts S and D', and engaging each other, the saws, means for operating the same, and means for operating the feed-chains, substantially as set forth.

4. In a machine for sawing sticks of particular dimensions, the combination of the frame A, transverse shafts I and D', the shaft D, having the fixed miter-gear g, the shaft S, having the engaging fixed miter-gear h, and the shafts respectively having fixed chain-wheels, as shown, the feed-chains passing over the wheels of the said transverse shafts, the shaft N, carrying the pinion M, the saws, arranged as described, and means for operating the said saws and shafts, substantially as specified.

5. A machine for sawing sticks of particular dimensions, consisting of two tables arranged at right angles to each other, and respectively provided with stock-feeding endless chains or belts having lugs fixed at the same distance apart with relation to each other, the chains of both tables being driven by the same gearing and rate of speed, and one of the tables having saws for cutting the sticks longitudinally, and the other table saws for cutting them transversely, substantially as specified.

In testimony whereof I affix my signature in presence of two witnesses.

WILLIAM MERRILL.

Witnesses:
MINER PASSMORE,
WM. WINSTON.